US008843895B2

(12) United States Patent
McFadden et al.

(10) Patent No.: US 8,843,895 B2
(45) Date of Patent: Sep. 23, 2014

(54) DEBUGGER CONNECTION

(75) Inventors: Andrew T. McFadden, Sunnyvale, CA (US); David P. Bort, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/611,126

(22) Filed: Sep. 12, 2012

(65) Prior Publication Data

US 2013/0014086 A1 Jan. 10, 2013

Related U.S. Application Data

(63) Continuation of application No. 11/936,969, filed on Nov. 8, 2007, now Pat. No. 8,336,029.

(51) Int. Cl.
*G06F 9/44* (2006.01)
*G06F 9/45* (2006.01)
*G06F 9/455* (2006.01)

(52) U.S. Cl.
CPC ................................. *G06F 9/45516* (2013.01)
USPC ............ 717/124; 717/100; 717/125; 717/148

(58) Field of Classification Search
CPC ............ G06F 9/45516; G06F 11/3688; G06F 11/3664
See application file for complete search history.

(56) References Cited

U.S. PATENT DOCUMENTS

| | | | |
|---|---|---|---|
| 6,691,298 B1 * | 2/2004 | Russo et al. ................. | 717/100 |
| 7,185,319 B2 | 2/2007 | Kaler et al. | |
| 7,293,256 B2 | 11/2007 | Crawford | |
| 7,350,194 B1 * | 3/2008 | Alpern .......................... | 717/124 |
| 7,441,233 B1 | 10/2008 | Orndorff et al. | |
| 7,467,370 B2 | 12/2008 | Proudler et al. | |
| 7,478,366 B2 | 1/2009 | Bickson et al. | |
| 7,669,186 B2 | 2/2010 | Nolan et al. | |
| 7,765,519 B2 | 7/2010 | Lunawat | |
| 7,840,943 B2 | 11/2010 | Volkov | |
| 7,890,931 B2 | 2/2011 | Lauzon et al. | |
| 8,312,438 B2 * | 11/2012 | Luedde ......................... | 717/148 |
| 8,522,209 B2 * | 8/2013 | Wintergerst et al. .......... | 717/124 |
| 8,572,569 B2 * | 10/2013 | Deshmukh et al. ........... | 717/124 |
| 2002/0144241 A1 | 10/2002 | Lueh | |
| 2005/0097534 A1 | 5/2005 | Clement et al. | |
| 2007/0055957 A1 * | 3/2007 | Birenheide et al. ........... | 717/124 |
| 2007/0113218 A1 * | 5/2007 | Nolan et al. .................. | 717/124 |
| 2008/0141222 A1 * | 6/2008 | Alpern .......................... | 717/125 |
| 2008/0209404 A1 | 8/2008 | Brady | |
| 2009/0089766 A1 | 4/2009 | Day et al. | |
| 2009/0103902 A1 | 4/2009 | Matsuura et al. | |

OTHER PUBLICATIONS

Mega et al., Debugging distributed object applications with the Eclipse platform, Oct. 2004, 5 pages.*

(Continued)

*Primary Examiner* — Thuy Dao

(74) *Attorney, Agent, or Firm* — Fish & Richardson P.C.

(57) ABSTRACT

The subject matter of this specification can be embodied in, among other things, a method that includes establishing a connection with one or more virtual machines using a debugger protocol configured to communicate debug commands to applications executed by the one or more virtual machines. The method also includes transmitting a request for a current state of the one or more virtual machines using the connection. Information associated with the current state includes state variables not controlled by an application receiving debug commands. The method includes outputting the current state of the one or more virtual machines for display to a user.

18 Claims, 9 Drawing Sheets

(56) References Cited

OTHER PUBLICATIONS

Kapfhammer et al., Testing in resource constrained execution environments, Nov. 2005, 5 pages, http://delivery.acm.org/1 0.1145/111 0000/11 01984/p418-kapfhammer.pdf.

Koju et al., An efficient and generic reversible debugger using the virtual machine based approach, Jun. 2005, 10 pages, http://delivery.acm.org/1 0.1145/1 070000/1 064992/p79-koju.pdf.

T. Takeuchi, OS Debugging Method Using a Lightweight Virtual Machine Monitor, Mar. 2005, 2 pages, http://delivery.acm.org/1 0.1145/1 050000/1 049273/228821 058.pdf.

Office Action issued in U.S. Appl. No. 11/936,969 on Jan. 4, 2012, 13 pages.

Notice of Allowance issued in U.S. Appl. No. 11/936,969 on Sep. 10, 2012, 9 pages.

\* cited by examiner

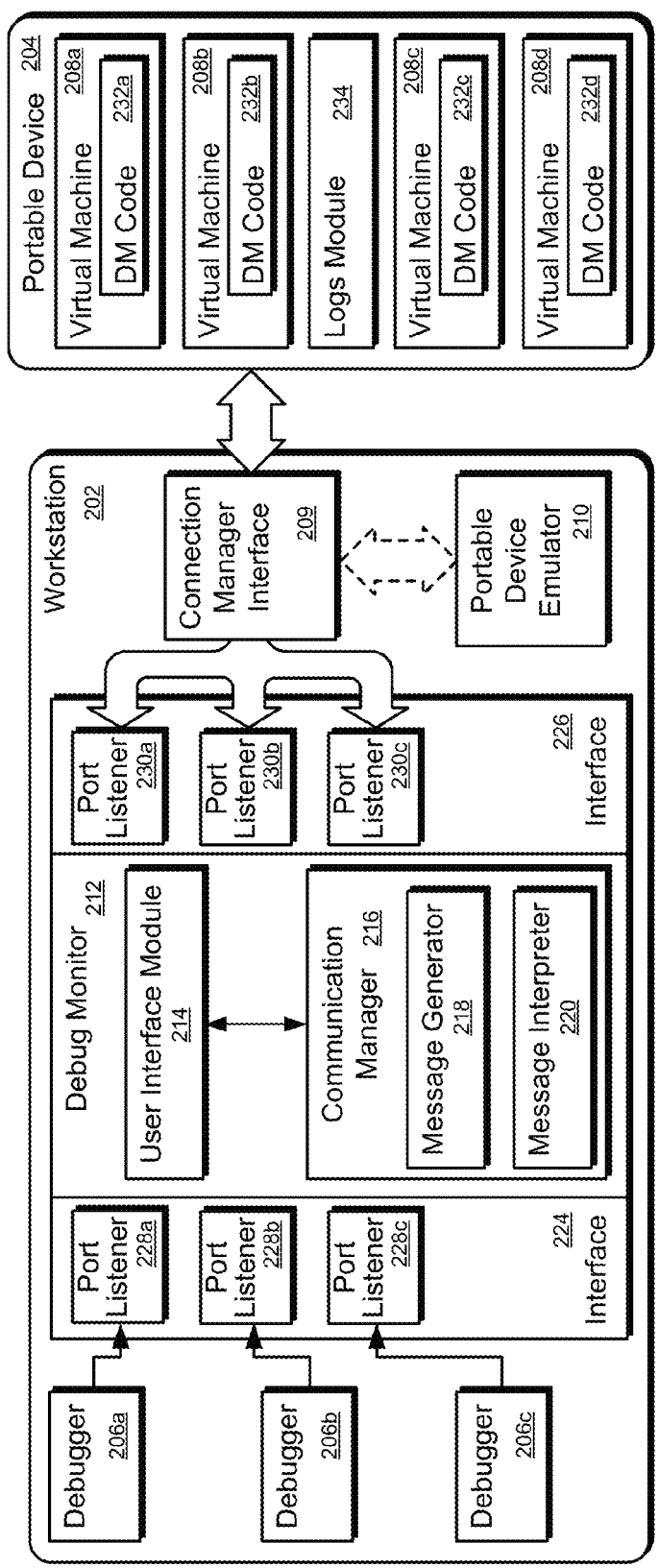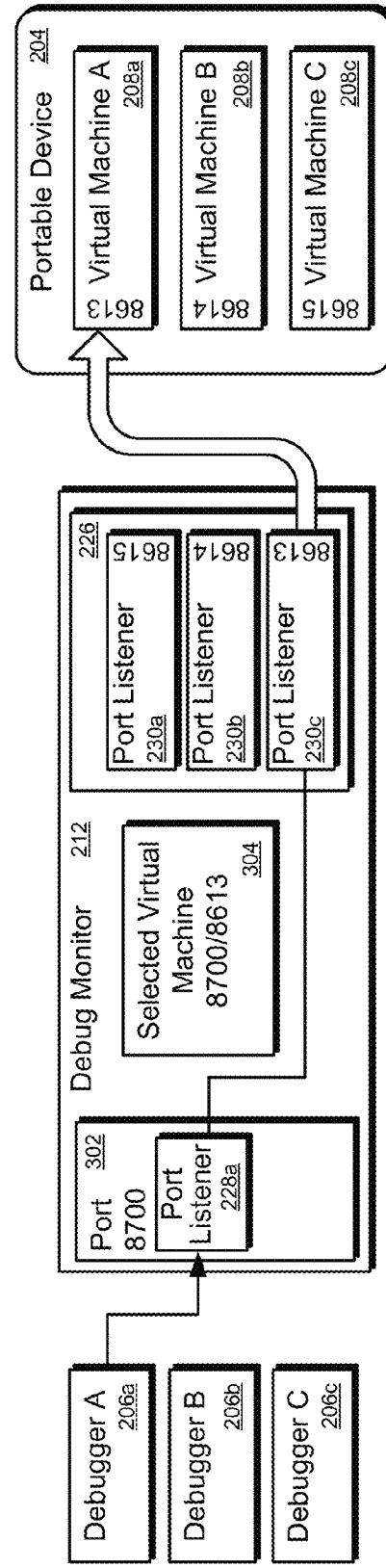

DEBUGGER CONNECTION

RELATED APPLICATIONS

This application is a continuation of co-pending U.S. application Ser. No. 11/936,969, filed on Nov. 8, 2007, the entire contents of which are incorporated herein by reference.

TECHNICAL FIELD

This instant specification relates to monitoring state information associated with virtual machines.

BACKGROUND

Debugging an application includes eliminating unexpected behavior exhibited by the application. An application developer can connect a device running the application to a workstation that includes a debugger. The developer can then use the debugger to communicate debugging commands to the application over the connection. For example, the debugger can stop the application and display the application's source code at a particular moment the application stopped in order to identify and eliminate unexpected behavior.

SUMMARY

In general, this document describes using a debug connection with a virtual machine to perform multiple functions that include requesting state information from virtual machines as well as debugging processes executing on the virtual machines.

In a first general aspect, a computer-implemented method is described. The method includes establishing a connection with one or more virtual machines using a debugger protocol configured to communicate debug commands to applications executed by the one or more virtual machines. The method also includes transmitting a request for a current state of the one or more virtual machines using the connection. Information associated with the current state includes state variables not controlled by an application receiving debug commands. The method includes outputting the current state of the one or more virtual machines for display to a user.

In a second general aspect, a system is described. The system includes a connection manager interface to establish a connection with one or more virtual machines using a debugger protocol configured to communicate debug commands to applications executed by the one or more virtual machines. The system also includes means for transmitting a request for a current state the one or more virtual machines using the debugger protocol. The current state includes data not controlled by an application receiving the debug commands. The system also includes an interface to output the current state of the one or more virtual machines for display to a user.

The systems and techniques described here may provide one or more of the following advantages. First, a single connection with a virtual machine can facilitate both debugging processes executed by the virtual machine as well as requesting current state information from the virtual machines. In another example, a described system can make debugging multiple applications easier for an application developer by providing a more convenient way to connect multiple debuggers to multiple virtual machines. A system to query the states of virtual machines can be provided in a way that is easy to integrate into existing software infrastructures that use existing debug protocols. In yet another example, a system is described where state information for multiple virtual machines can be monitored simultaneously.

The details of one or more embodiments are set forth in the accompanying drawings and the description below. Other features and advantages will be apparent from the description and drawings, and from the claims.

DESCRIPTION OF DRAWINGS

FIG. 2 shows a block diagram of an exemplary system for transmitting virtual machine state queries over a debugger connection.

FIG. 3 shows a block diagram of an exemplary system for connecting multiple debuggers to multiple virtual machines.

Like reference symbols in the various drawings indicate like elements.

DETAILED DESCRIPTION

Figure 1:
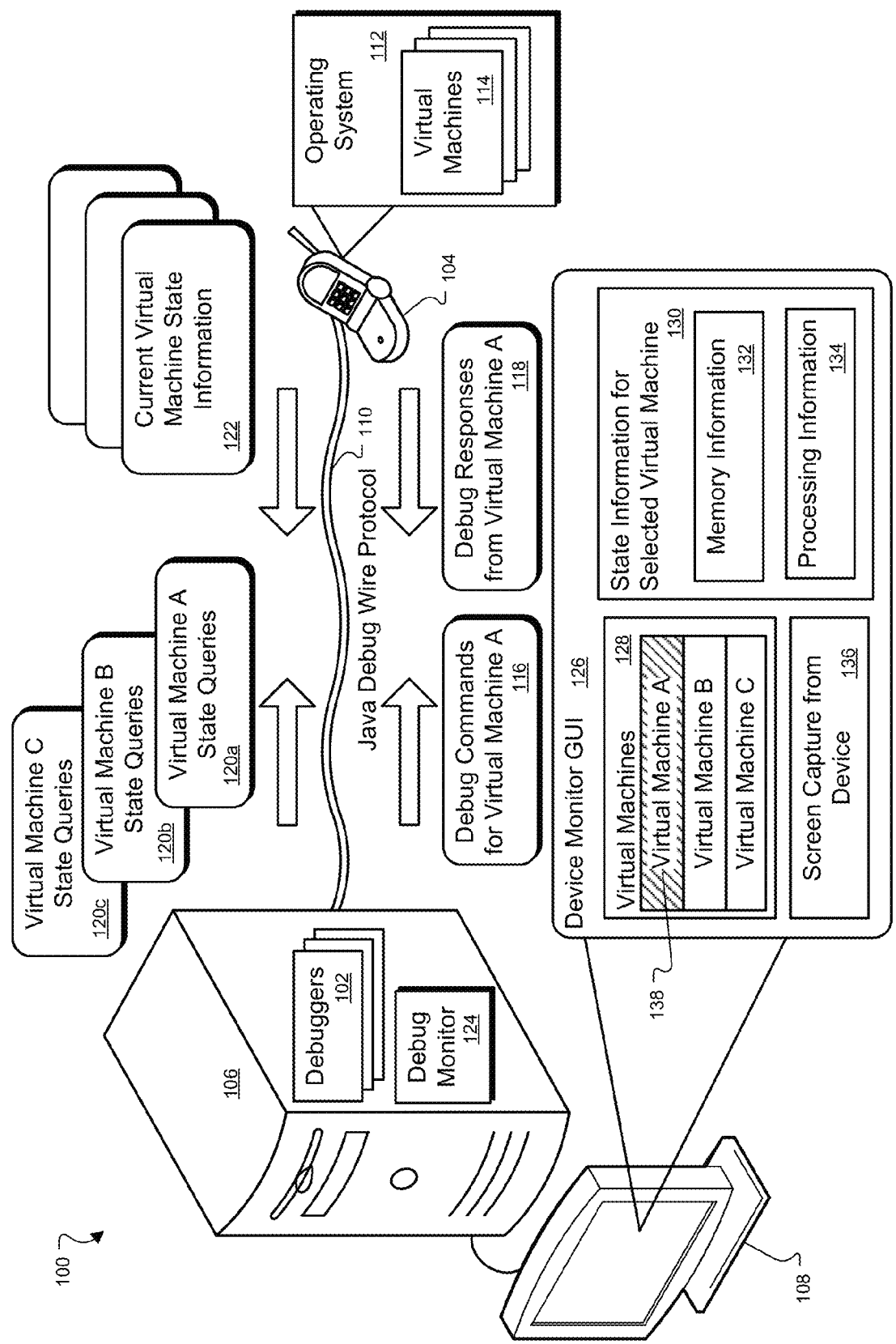
FIG. 1 shows a schematic diagram of an exemplary system for transmitting virtual machine state queries over a debugger connection.

FIG. 1 shows a schematic diagram of an exemplary system 100 for transmitting virtual machine state queries over a debugger connection. For example, the debugger connection can exist between a debugger on one device and a virtual machine on a portable device. In some implementations, the debugger connection serves multiple purposes. For example, the debugger connection can be used to debug applications running on the portable device as well as to request information (e.g., current state information) about one or more virtual machines running on the portable device.

The debugger connection can use, for example, a Java Debug Wire Protocol (JDWP) or any other suitable debugger protocol. For the JDWP, virtual machine state queries can be transmitted using unreserved bits within the protocol according to some implementations.

Queries transmitted via the debugger connection can be used to request current or live state information for the virtual machines, such as Java virtual machines (JVMs). For example, live or current state information can include the identification of threads (e.g., separate applications/processes) that each virtual machine is running, memory usage for each thread, memory usage for the entire device, CPU usage, stack information, resource utilization, configuration metrics, performance statistics, etc.

The CPU information can be used, for example, to determine which applications use more CPU time than other applications concurrently running on the same virtual machine. Such CPU usage information can help to determine processes that are computationally expensive (e.g., due to erroneously executing in an infinite loop), or which processes are in a wait mode. In another example, a user can determine processes that inefficiently use memory (e.g., due to excessive page faults) based on the memory usage information.

Current, or live, state information can be used to compare status and resource information for several threads at once. For example, a user debugging one application on a portable device (e.g., a cell phone) can use live state information to view information associated with other processes (e.g., applications that perhaps are not currently being debugged) to identify possible conflicts, problems, or issues.

In some implementations, the multiple-purpose debugging connection can monitor state information for multiple threads. For example, a virtual machine (or virtual machines) can simultaneously execute more than one thread or application. The multiple-purpose debugging connection can permit a user to request information for threads and applications simultaneously executed by the virtual machine(s). The user can use such information, for example, to determine why an application is executing slowly (e.g., which may occur if concurrent processes on the same virtual machine are competing for CPU cycles or memory).

In some implementations, communications between debuggers and virtual machines can be interleaved within a single debugger connection so that multiple simultaneous communications can occur between multiple debuggers and multiple virtual machines.

In some implementations, a user can debug applications hosted by different virtual machines on a single device. For example, in some implementations, a cell phone can execute several JVMs, each of which is running different applications such as a phone function application, a device settings application, a device content application (e.g., an application that manages data stored on a device), web applications (e.g., browsers, etc.), device drivers, embedded systems, etc.

In some implementations, applications on virtual machines are written in different programming languages (e.g., Java, C, C++, etc.), and as such, the corresponding debuggers may be different. A debug monitor can negotiate connections between multiple debuggers and virtual machines, which in some implementations, can make debugging the multiple applications easier for a user.

For example, the debug monitor can automatically detect the ports that virtual machines are using and connect a corresponding debugger to the appropriate port. Doing so can eliminate the need for the user to manually determine a port number for a virtual machine, such as by searching for the port number in log files that are output by the virtual machines and then specifying that port number as the output port for the appropriate debugger.

The debug monitor can also notify the user when new threads are created and when existing ones end. In some implementations, the debug monitor can automatically select the debugger that is appropriate for an application, such as by parsing an executable's file name for the suffix.

Referring to FIG. 1, a debugging session can exist between any of one or more debuggers 102 and one or more virtual machines 114 running on a portable device 104 (e.g., a cell phone, PDA, etc.). For instance, the debugger 102 can execute on a server 106 that is coupled with a workstation 108. The portable device 104 includes the one or more virtual machines 114 and an operating system, or platform 112.

Each of the virtual machines 114 can execute one or more applications that a user can debug using the debuggers 102. For example, the user can employ displays and controls of the debugger 102 to debug applications (such as Java applications) on the portable device 104. Such a debugging session can use a debugger protocol 110, such as the Java Debug Wire Protocol. In general, debugger protocols 110 can be transmitted via a wired connection (e.g., a USB connection) or a wireless connection (e.g., a Bluetooth or a Wimax) that can be direct from the workstation to the portable device or remote through a network such as a local or wide area network.

During a debugging session, the user can employ the workstation 108 to enter debug commands 116, such as debug queries for an application executed by virtual machine "A" 116. In particular, virtual machine "A" can be one of several virtual machines 114 hosted by the portable device 104. In one example, the debug commands 116 entered by the user are commands to step through lines of code for a particular cell phone application. Other debug commands 116 can include, for example, user commands or queries that can: examine specific variables in the application, set variable "watches" to let the user know when a variable's value changes, set stop-line conditions (e.g., execute the application until a particular numbered line is reached), set the number of iterations to execute in a loop (e.g., a DO, WHILE, UNTIL, REPEAT, etc.), or any other commands or queries a user can issue to debug a program or application.

The debugger protocol 110 can transmit the queries 116 (e.g., via a USB connection) to the corresponding virtual machine(s) 114 associated with the debugging session. In response to the queries 116, one of the virtual machines 114 can send one or more responses 118 to the debugger(s) 102. For example, the responses 118 can include the values of variables being examined or the notification that the value of a watched variable has changed. Other responses 118 can be a notification that the virtual machine 114 has executed the application up to the point of the stop-line specified by the user, and as such the user can determine other information at the current state of the application's execution.

In addition to handling debug commands 116 and responses 118, the debugger protocol 110 can be used to provide live state information for the virtual machines 114. For example, while using the workstation 108 to debug a phone application executing on one of the virtual machines 114 (e.g., virtual machine "A"), the user may also be interested in obtaining live state information for virtual machine "A." Specifically, the user may want to obtain information regarding CPU usage, memory usage, or other information that may not be accessible using debug commands 116.

For example, the user may desire to know virtual machine state information at a specific time in a phone application's execution, such as at a stop-line point. As such, the user can enter one or more commands using the workstation 108, which transmits the commands to virtual machine "A." For example, a user can enter queries to obtain CPU or memory use information. The commands can be sent via the debugger protocol 110 as a set of virtual machine "A" state queries 120a.

In response to the state queries 120a, the corresponding virtual machine 114 (e.g., virtual machine "A") can respond with current virtual machine state information 122. For example, if the purpose of the user's command is to obtain CPU and memory usage information, the state information 122 can include the percentage of CPU and memory usage of processes running on virtual machine "A." Such information can be transmitted via the debugger protocol 110 to a debug monitor 124 and the user can view the information, for example, on the workstation 108.

In some implementations, such live state information 122 can remain displayed, for example, as the user continues to debug the selected application. As a result, the user can compare the CPU and memory usage of the debugged application with that of other processes running on virtual machine "A" (or other virtual machines executed by the portable device 104).

The debug monitor 124 can be used to negotiate connections between one or more debuggers 102 and virtual machines hosted on the portable device. For example, the user can simultaneously use multiple debuggers 102 to debug multiple applications (where the applications executed by a single virtual machine or multiple virtual machines 114).

In some implementations, the debug monitor 124 interleaves multiple distinct communications sent and received by the individual debuggers so that the correct transmissions are associated with the corresponding debugger/virtual machine pairs. This may permit the debug monitor 124 to support multiple debugger connections simultaneously. For example, separate debugger connections can exist for applications running on multiple virtual machines 114, such as virtual machines "A," "B" and "C." Queries such as debug query 116 can originate from different debuggers 102, and the debug monitor 124 can manage routing the responses 118 to the appropriate debugger 102. This is discussed in more detail below.

The debug monitor 124 can display on a device monitor GUI 126 debug and machine state information for the virtual machines to which the server, or workstation 106 is connected. For example, the device monitor GUI 126 can display information on the workstation 108 for the debugging sessions established for one or more portable devices 104.

The device monitor GUI 126 can serve as the user interface for the debug monitor 124, and as such, can provide several real-time displays on the user's workstation 108. For example, a virtual machines list 128 can identify the names and port information associated with the virtual machines 114 (e.g., virtual machines "A," "B" and "C") which are connected to the server 106 and to which the user may have access.

A state information area 130 can display live state information, such as to provide a real-time summary and status of virtual machines on the portable device. Such state information can include a memory information area 132, a processing information area 134, and other areas for displaying specific live state information for virtual machines 114.

A screen capture area 136 can also provide the user with a graphical display, for example, of screenshots taken from the portable device 104. In certain implementations, the screen capture area 136 displays information currently displayed by the portable device's screen. In another implementation, the information displayed in the state information area 130 and the screen capture area 136 (and other such areas) can correspond to the particular virtual machine that the user has selected or highlighted in the virtual machines list 128. For example, virtual machine "A" 138 is depicted as shaded or highlighted, so the information displayed in areas 130 and 136 can correspond to virtual machine "A." The captured screen shots can be used to document bugs for bug reports.

In one example, the user can employ the device monitor GUI 126 while one or more debuggers 102 are running, in order to have additional live state information available while debugging applications the portable device 104. For example, the user can have separate windows (e.g., for individual debuggers, etc.) open on the workstation 108 simultaneously. While debugging one application (e.g., a cell phone application running on virtual machine "A"), the user can have a window devoted to issuing debug commands 116 and receiving responses 118. Such a window can be a specialized GUI for the debugger 122, for example, specific to the language (e.g., JAVA) of the application being debugged. At various times during the debugging session, the user can also display the device monitor GUI 126 to show live state information for the corresponding virtual machine.

In some implementations, the debug monitor 124 can automatically issue state queries 120 in order to maintain up-to-date information that is displayed in the virtual machines list 128 and areas 130 and 136. Similarly, the responses 122 received from the queries 120 can populate portions of the screen included in the device monitor GUI 126. The debug monitor 124 can intercept the debug commands 116 from the debuggers 102 and originate the virtual machine state queries 120 and package them together into a single message using the debugger protocol 110. The debug monitor 124 can then transmit the message to the portable device.

In addition, the debug monitor 124 can also receive the responses 118 and 122 received via the debugger protocol 110 from the portable device 104. The debug monitor 124 can pass the debug responses 118 to the appropriate debugger 102 and can display the current virtual machine state information using the device monitor GUI 126.

In some implementations the current virtual machine state information is transmitted sua sponte. For example, the debug monitor 124 receives additional information that is not query-driven, such as threads that may have started on any of the virtual machines 114 or other information indicating a change in state for a virtual machine. This information can be displayed within the device monitor GUI 126.

FIG. 2 shows a block diagram of an exemplary system for transmitting virtual machine state queries over a debugger connection. The debugger connection can exist between a workstation 202 and a portable device 204 (e.g., a cell phone, PDA, etc.). For example, a user (e.g., a computer technician) can use the workstation 202 to debug an application that executes on the portable device 204. In one example, the application can be cell phone software, and the user can be using the workstation 202 to debug the cell phone software. The debugger connection between the workstation 202 and the portable device 204 can be established using a USB connection, a wireless connection, or any other connection capable of supporting a debugging session.

The workstation 202 includes one or more debuggers 206a-c that can be used to debug applications that execute on virtual machines 208a-d. For example, the debugger 206a can be a Java debugger that is being used to debug a Java application executing on virtual machine 208a.

The workstation 202 can include a connection manager interface 209 for interfacing with the portable device 204. Specifically, the connection manager interface 209 is responsible for connecting to the specific virtual machine 208 that executes the application to be debugged by a particular debugger 206. Communications to the portable device 204 can include debug queries (e.g., stepping instructions, variable examinations, variable watches, etc.) as well as queries that the user can enter in the user interface module 214 (or can be generated automatically) to obtain live state information of virtual machines 208. The connection manager interface 209 can also receive information sent by the portable device 204 to the workstation 202, or more specifically, sent by the virtual machines 208 to the debuggers 206. For example, the information received from the portable devices can be responses to debug commands and/or responses to queries for live state information of virtual machines 208.

In many cases, the connection manager interface 209 can establish the debugging session directly with a given virtual machine 208, such as by USB, wireless, firewall, serial, parallel, etc. In a USB implementation, for example, a USB cable can be used to physically attach the workstation 202 directly to the portable device 204.

In other implementations, the workstation 202 can include an emulator that simulates functions of a device (e.g., for testing purposes). For example, a portable device emulator 210 can simulate the functions of a cell phone. The connection manager interface 209 can establish a connection with the portable device emulator 210 as if the emulator 210 were a physical device.

The workstation 202 can include a debug monitor 212 that is used to monitor and manage the connections between multiple debuggers (e.g., debuggers 206a-c) and multiple portable devices 204. Using the debug monitor 212, the user can track thread states (e.g., thread creation/exit, busy/idle status, etc.) and receive/view information regarding overall heap status, which can be used to, for example, generate a heap bitmap display or a fragmentation analysis. Also, the debug monitor 212 can provide a GUI for the user to view state information corresponding to one or more virtual machines 208a-d.

The debug monitor 212 can receive commands entered by the user via debuggers 206a-c and can communicate with the virtual machines 208a-d. Responses (e.g., based on the commands/queries) received from the virtual machines 208a-d can also be handled by the debug monitor 212, which can, for example, reformat the responses into formats that the individual debuggers 206a-c can understand. Alternatively, the debug monitor 212 can simply identify the correct debugger for a received response and transmit the response to the identified debugger without additional reformatting.

The debug monitor 212 can include a user interface module 214. A user can, for example, enter commands in the user interface module 214 in order to receive live state information from the virtual machines 208a-d. In some implementations, requests for live state information include requests for information about CPU usage, memory usage, etc. The user can use the live state information with other debug responses in order to debug applications and determine virtual machine states that affect (or are affected by) the applications.

The debug monitor 212 can include a communication manager 216 which can be used by the debug monitor 212 to manage communications with one or more portable devices 204. For example, the communication manager 216 can use commands/queries entered by the user (e.g., commands to obtain live state information from a particular virtual machine) to generate a message to be sent to the corresponding virtual machine. The communication manager 216 can include a message generator 218 and a message interpreter 220.

The message generator 218 can generate messages based on the commands that the communication manager 216 receives from the user interface module 214. In some implementations, the commands issued can be generated automatically based on selections from the GUI of the debug monitor 212 or based on commands entered, for example, into text entry elements of the GUI. For example, a user may select a particular virtual machine to monitor from a list of virtual machines displayed on the GUI. Once the particular virtual machine is selected, the message generator can create a series of messages that request different state information from the virtual machines. For instance, one message created by the message generator 218 may be a total VM memory message that requests the total memory used by the particular virtual machine.

Similarly, the message interpreter 220 can be used to interpret messages received from portable devices 204 and provide the messages in a format that is readable by a user of the GUI of the debug monitor 212.

The debug monitor 212 can include interfaces 224 and 226 for interfacing with components outside of the debug monitor 212. The interface 224 can include port listeners 228a-c for listening for inputs from debuggers 206. For example, the port listener 228a can listen for inputs from the debugger 206a, the port listener 228b for the debugger 206b, and so on. Such port listeners 228 can listen for specific debug queries that the user can request using a particular debugger. For example, a user can enter a debug query to examine the value of a particular variable, such as a variable that is part of an application running on the virtual machine 208a. The debug monitor 212 can identify the appropriate virtual machine to receive the debug query and initiate a transmission of the query to that virtual machine. The process of identifying the appropriate virtual machine is described in more detail in association with FIG. 3.

The interface 226 can handle communications between the debug monitor 212 and the connection manager interface 209. As such, the interface 226 can include port listeners 230a-c for listening for responses received from virtual machines 208 on the portable device 204. One example type of response can correspond to a particular debug query originally entered on one of the debuggers 206 or to a live state information query entered in the user interface module 214. For example, if the user entered a debug query on the debugger 206b to examine the value of a particular program variable, the response received via the port listener 230b can include the variable's value at that time in the program's execution. In another example, if the user is displaying CPU and/or memory statistics for threads executing on virtual machine 208b, the response received via port listener 230b can include the CPU and memory percentages allocated, for example, by thread.

The debug monitor 212 can request different kinds of state information from the virtual machine 208. For example, some types of information can include CPU and memory usage. Other types of information can relate to the "thread states" such as: running, sleeping, blocked, waiting, initializing, starting, native (executing native code), waiting on a virtual machine resource, suspended, etc. The user who is debugging the application can use such information, for example, in combination with debugger commands/responses in order to diagnose a specific problem with the application's execution.

The debug monitor 212 can request heap information from the virtual machine 208. Such heap information received can be represented, for example, by a color-coded bitmap sent to the debug monitor 212. The bitmap can indicate which stretches or blocks of memory are free and which are in use. For compactness, the bitmap can be run-length encoded and based on multi-byte "allocation units" rather than byte counts. In some implementations, the debug monitor 212 can correlate the bitmap with more detailed object data, such as to associate bitmap data with virtual addresses.

Requests for heap and other state information can be made, for example, in a series of function calls. For example, heap information can be broken into segments within the virtual machine, and due to memory constraints it may be desirable to send the bitmap in smaller pieces or chunks. To avoid ambiguity, the chunks can be marked and/or grouped with explicit "start" and "end" messages, such as when one heap information chunk is sent or when several chunks are sent over time.

Messages used to send heap information can include a "heap ID" that can be used to differentiate between multiple independent heaps (e.g., Java Virtual Machine heaps) or perhaps a native heap. Information about different heaps can be sent simultaneously, so all heap-specific information can be tagged with the "heap ID".

In order to communicate with the debug monitor 212, each of the virtual machines 208*a-d* can have one or more pieces of debug manager code 232*a-d* to interpret messages sent by the debug monitor 212. For example, the debug manager code 232 can include logic and/or data (e.g., look-up tables, etc.) that allow the virtual machines 208 to differential the commands/queries that are received, such as debugger 206 queries and various debug monitor 212 queries for live state information (e.g., CPU, memory, heap requests, etc.). If a particular virtual machine does not have a piece of debug manager code 232, it can view the debug monitor 212 as a debugger. By treating the debug monitor 212 as debugger, the virtual machines 208 can still receive debug commands without crashing or experiencing an error.

In some implementations, the debug monitor 212 can be a plug-in, such as a component that can be used with other tools in an open development platform or an integrated development environment (IDE) (e.g., Eclipse, etc.). In this way, the debug monitor 212 can be integrated with other tools and can provide live state information of virtual machines 208 in addition to handling debug queries and responses normally associated with a standard debugger.

The debug monitor 212 can have access to other components of the portable device, such as a logs module 234. For example, the logs module 234 can provide information about logs that are maintained on the portable device. Log information can include historical data, such as event information that can be used to detect problems on the portable device that may have occurred before the debug monitor 212 was attached to the portable device for debug purposes. For instance, a particular line in an event log can indicate the occurrence of an error or a specific event (e.g., user actions or inputs on a cell phone, a "bad" chip, etc.). Such log information can be used to diagnose and/or reconstruct a problem with the portable device. In a sense, log information can serve as a "black box," making it possible for the debug monitor 212 to determine the cause for a software and/or hardware failure long after the event occurred. For example, a technician may be able to "debug" a problem by viewing log information displayed in the debug monitor 212 without ever using the debugger 206 to step through code.

The virtual machines 208 to which the debug monitor 212 communicates can include Java virtual machines (JVMs). Depending on the type of the virtual machine being used (e.g., JVM or other), different types of debug protocols can be used for communicating with the virtual machines. When a Java Debug Wire Protocol (JDWP) is used, for example, unused bytes in the protocol can be used to insert vendor-specific packets that communicate state information queries to the JVMs.

In some implementations, the debuggers, the debug monitor, and the virtual machines can be on the same portable device. For example, a portable device such as a cell phone or PDA can include one or more debuggers 206 and a debug monitor 212 in addition to the virtual machines (e.g., JVMs) that comprise the cell phone. This configuration can be useful, for example, in debugging a cell phone without having to connect to a front-end debugging device, such as the workstation 202.

FIG. 3 shows a block diagram of an exemplary system for connecting multiple debuggers to multiple virtual machines. For example, multiple debuggers, such as debuggers 206*a-c*, can be running simultaneously, in order to debug multiple applications on the virtual machines 208*a-c*. To assure that debug commands entered on one debugger (e.g., debugger "A" 206) are received by the appropriate virtual machine (e.g., virtual machine "A" 208*a*), the debug monitor 212 can direct the messages. The debug monitor 212 can, for example, keep track of which debuggers are assigned to which virtual machines 208 on the portable device 204.

To interface with debuggers 206, the debug monitor 212 can include an 8700 port 302 that can receive debug commands entered on the debugger "A" 206*a*. The 8700 port 302 can include a port listener 228*a* which can be, for example, assigned to the debugger "A" 226*a*. Such assignment can occur, for example, when the debugger "A" 206*a* first connects to the debug monitor 212. The debug monitor 212 can use the port listener 228*a* to listen for query commands entered on the debugger "A" 206*a* that the debug monitor 212 is to forward to the appropriate one of the virtual machines 208. Other debuggers, such as debuggers 206*b* and 206*c*, can have their own port listeners similar to port listener 228*a*. Alternatively, the debuggers can each share the port 8700 as a default communications port as well as broadcasting to other debugger-specific ports as well. For example, the 8700 port 302 may be a default port number typically used for debuggers.

The debug monitor 212 can also use ports for the interface it uses to communicate with the portable device 204. Separate ports can exist for each of the virtual machines 208. These ports can be determined via a query of logs output by the virtual machines using a log query process previously described. After the determination of ports used by the virtual machines, the port listeners 230*a-c* can be assigned to the ports. The port listeners can facilitate communication with the corresponding virtual machines 208. For example, port listener 230*c* can correspond to the port used for communicating with the virtual machine "A" 208*a*. Similarly, port listeners 230*a* and 230*b* can be used for virtual machines 208*c* and 208*b*, respectively. Correlations between port listeners 230*a-c* and virtual machines 208*a-c* are depicted in FIG. 3 using numeric port numbers in the range 8613-8615. For example, port listener 230*c* and the virtual machine "A" 208*a* both reference the same numeric port number 8613 indicating this port is used for communication between the virtual machine "A" and the debug monitor 212.

The debug monitor 212 can include a selected virtual machine component 304 that connects a debugger to a virtual machine. In certain implementations, once a connection is established between the debug monitor 212 and the debugger, a user is free to select a different virtual machine without disturbing a debug connection established between the debug monitor 212 and the portable device. For example, if the selected virtual machine component 304 is used to select a virtual machine corresponding to port 8613, connecting a debugger to port 8613 or 8700 will have the same effect, namely, establishment of communication between the debugger and the virtual machine. If the virtual machine component 304 is used to select a virtual machine corresponding to port 8614, connecting the debugger to port 8614 or 8700 will have the same effect. In this way, a debugger communicating via port 8700 can communicate with different virtual machines without changing ports because the selected virtual machine component 304 can monitor debug communications on, for example, port 8700 and can pass them to the selected virtual machine regardless of the virtual machine's current port. The selected virtual machine component 304 can access port-virtual machine assignments from a data table or other data structure for look-up when messages (e.g., debug commands and responses) are sent through the debug monitor 212.

For example, when a debug command (e.g., "tell me the value of variable XYZ at this moment") is issued at a debugger (e.g., the debugger "A" 206*a*), the debug monitor 212 can receive the debug command. Specifically, the debug command can be received by the debug monitor 212 via the port listener 228*a* that is a default port that is monitored for debug communications. The user can select a virtual machine to debug using the user interface module 214 of the debug monitor 212. The selected virtual machine component 304 can determine the port number for the selected virtual machine using information such as a port look-up table. In the example of FIG. 3, the port number for the selected virtual machine is 8613. As such, the debug query can be routed directly to the virtual machine "A" 208*a* for which the debug command was intended. In response, the virtual machine "A" 208*a* can respond to the query (e.g., "the value of variable XYZ is 29.0"). The response can be routed through the same port 8613 that handled the query and then passed to the debugger currently connected via the port 8700.

Figure 4:
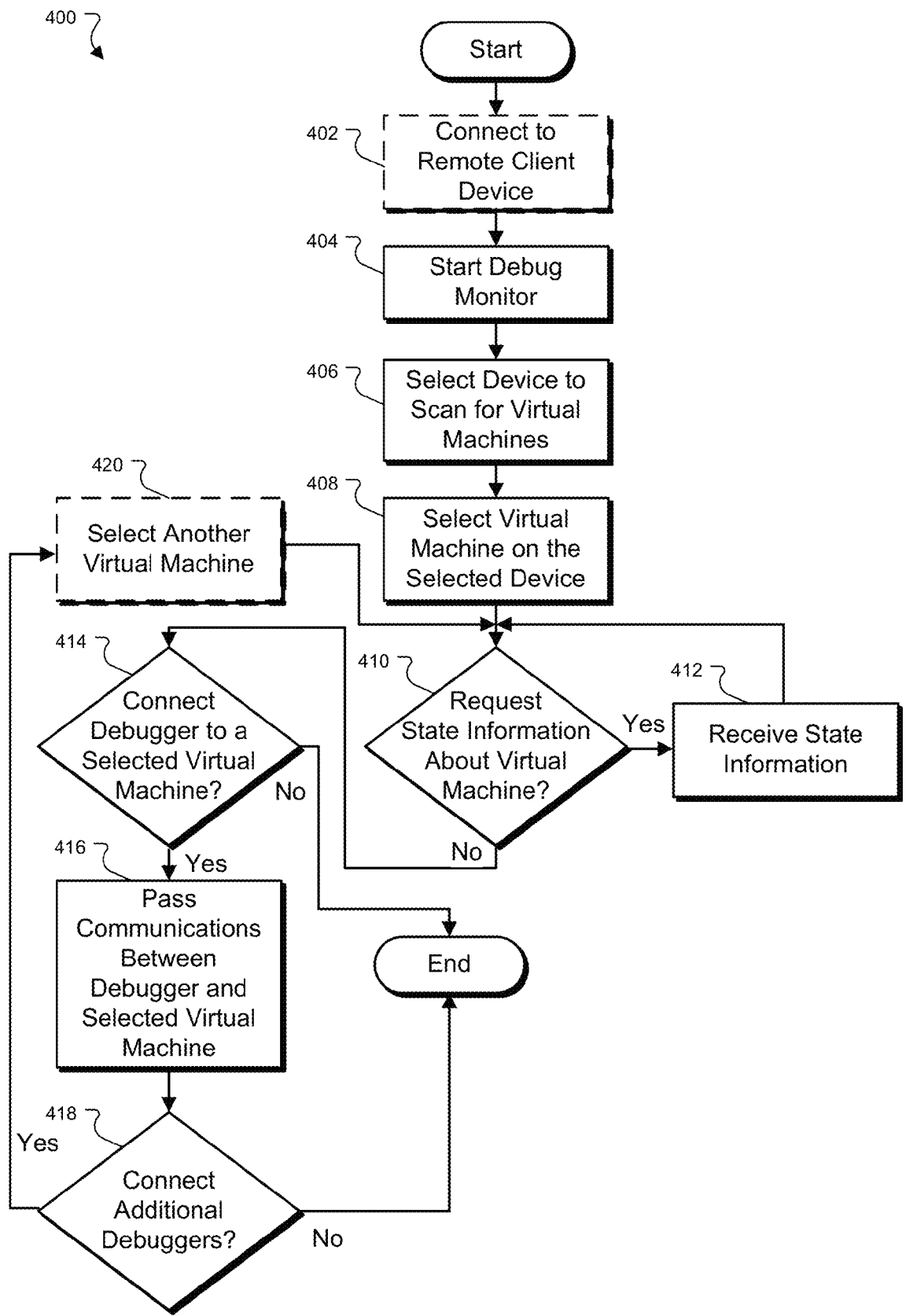
FIG. 4 shows a flow chart of an exemplary process for communicating with virtual machines.

FIG. 4 shows a flow chart of an exemplary process 400 for communicating with virtual machines. For instance, the process 400 can be used to connect to a portable device (or a local emulator) for debugging purposes and to request state information from virtual machines on the portable device.

The process 400 optionally begins when a remote client device (e.g., a cell phone, PDA, etc.) is connected 402. As was described with reference to FIG. 1, the connection can be between the workstation 108 (coupled with the server 106) and the portable device 104. Using such a connection, the debugger 102 can be connected to an application executing on one of the virtual machines 114. Such a connection can occur when a user using the workstation 108 selects an application to be debugged. For example, the user may be preparing to debug a Web application on a PDA after connecting the workstation 108 to the portable device 104 (e.g., the PDA).

The connection to the remote client device can be optional. For example, referring to FIG. 2, the debug monitor 212 can instead connect to the portable device emulator 210 that is installed on the workstation 202.

A debug monitor is then started 404. For example, referring to FIG. 1, the debug monitor 124 on the workstation 108 can be started.

A device is selected from which to scan for virtual machines 406. For example, a user can select that the debug monitor 124 scan the portable device 104, which can include one or more virtual machines that are being executed by the device 104. The scan detects the virtual machines executing on the portable device 104. In another implementations, the scan can also detect the virtual machines installed on the device 104 regardless of whether the virtual machines are being executed by the device 104 or not.

In another example, the user selects the local workstation to scan. The debug monitor can scan the workstation for virtual machines executed by an emulator (or multiple emulators) that are currently running on the workstations. Additionally, the scan may also detect virtual machines that are installed regardless of whether they are currently executed by the emulator(s).

In yet another example, both the local workstation and a portable device can be selected. For example, a user can select that a scan for virtual machines be initiated on both the local workstation and a portable device.

A virtual machine is selected from the selected device 408. For example, once the virtual machines are detected, a user can select one of the virtual machines using a user interface such as the user interface module 214.

It is determined whether state information about the selected virtual machine is requested 410. For example, the debug monitor can issue messages requesting state information about the selected virtual machine. If these messages are generated, the method 400 can proceed to step 412, where the state information is received by the debug monitor.

If no further information about the selected virtual machine is to be requested 410, then the method 400 can proceed to step 414. For example, a message requesting state information may have been previously transmitted to the virtual machine and may not need updating.

After receiving the state information, it can be displayed to the user using the device monitor GUI 126. Some state information can be constantly updated by the debug monitor 124, which would require repeating the steps 412, 410. For example, information that can be provided and updated automatically can include memory information 132 and processing information 134. In other implementations, some state information may be requested by the user. For example, information that can be requested through direct user interaction can include a screen capture from the device 136. For instance, the user can enter a command using the device monitor GUI 126 to capture the current screen display of the portable device running the application being debugged.

In step 414, it is determined whether to connect a debugger to a selected virtual machine. For example, a user may start a debugger in order to debug an application or process executing on a selected virtual machine. In some implementations, the debug monitor can automatically detect when a debugger is executed and can monitor a port assigned to the debugger. In another implementation, the debug monitor simply monitors a default port that all or most debuggers use to communicate.

Communications are passed between the debugger and the selected virtual machine 416. For example, the communications can include debug commands (e.g., debug queries for virtual machine "A" 116) and responses (e.g., debug responses for virtual machine "A" 118).

A determination can be made to connect additional debuggers 418. If a new debugger is connected step 420 can be performed. For example, a user may start a different debugger to debug a different application or process that is executed by a different virtual machine. In this case, a user selects the different virtual machine and steps starting with step 410 can be repeated. Alternatively, although not shown in the flow chart, the method can proceed directly to step 414 if a new virtual machine is not selected (e.g., if the new debugger to connect is executed by the currently selected virtual machine).

In either case, when step 414 is executed again, the debug monitor can detect the execution of the new debugger and monitor a communications port assigned to the debugger, or the debug monitor can simply monitor a default communications port. A user may select the different application or process to debug. The method 400 can then proceed again to step 416, where the debug monitor can pass communications between the newly selected application or process and the newly connected debugger.

If it is determined that another debugger is not to be connected in step 418, the method 400 can end.

Figure 5:
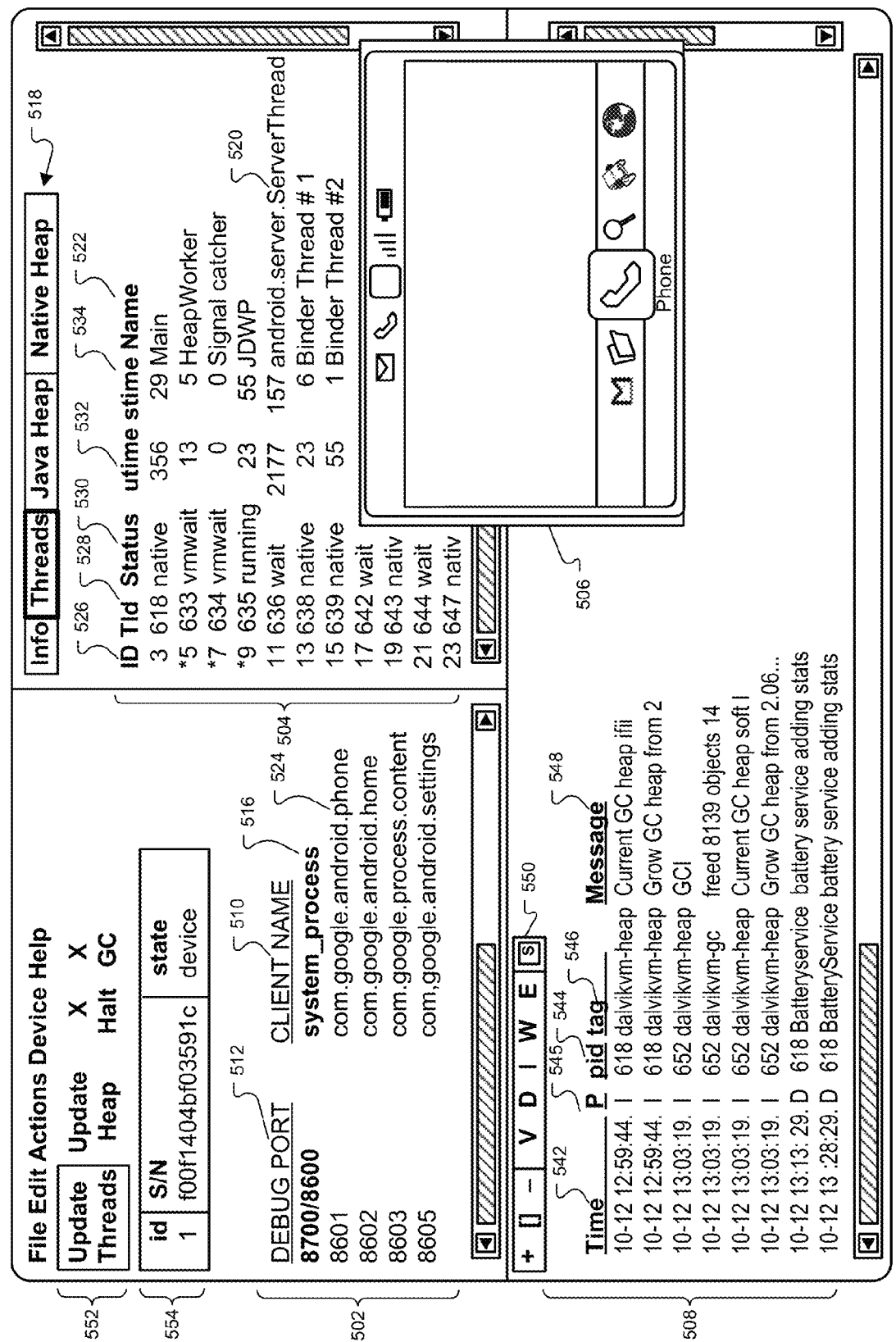
FIG. 5 shows an exemplary screenshot of a user interface for displaying information about virtual machines.

FIG. 5 shows an exemplary screenshot 500 of a user interface for displaying information about virtual machines. The screenshot 500 includes an example of current or live state information displayed by the device monitor GUI 126. Specifically, the example information includes information displayed when the user's workstation 108 is connected to multiple virtual machines 114 hosted on a portable device. The user can be using multiple debuggers 102 to debug one or more applications on the virtual machines 114. The screenshot 500 can be one of several displays that the debug monitor 124 generates for debugging sessions established with portable clients 104. Information for other virtual machines can also be displayed on the screenshot 500, such as virtual machines for which no debugging sessions are currently established.

The screenshot 500 can include several sections or display areas, such as a virtual machines display area 502, a selected virtual machine display area 504, an image capture display area 506, and a log display area 508. The information displayed in these areas 502-508 can change dynamically. For example, the information in the areas 502-508 can change as new live state information is received from the portable device from which the data is derived. Moreover, selections in one area can affect data displayed in another area. For example, the threads displayed in the selected virtual machine display area 504 can depend on the virtual machine selected in the virtual machines display area 502.

In another example, the log information displayed in the log display area 508 can also depend on the virtual machine selected in the virtual machines display area 502.

The virtual machines display area 502 can identify all of the virtual machines and the ports associated with them. Each entry or line in the virtual machines display area 502 can represent a separate virtual machine. A client name column 510 can identify the name of the virtual machine. For example, if the virtual machine is associated with cell phone functions, the client name column 510 can contain "com.google.android.phone" for the device's entry in the virtual machines display area 502.

A debug port column 512 can identify a numeric port ID of each virtual machine. The debug port column entry for the system_process virtual machine indicates that the debugger for this virtual machine is communicating with the debug monitor via port 8700. The virtual machine installed on a portable device, however, is communicating using port 8600. The debug monitor receives the commands from the debugger on the port 8700 and transmits then to the virtual machine using the port 8600 as described, for example, in association with FIG. 3.

The selected virtual machine display area 504 can summarize information about a selected virtual machine, such as the active threads and other information corresponding to the virtual machine selected from the virtual machines display area 502. For example, as depicted, the selected virtual machine display area 504 shows information for the system_process virtual machine entry 516. The selected virtual machine display area 504 includes a control 518 for selecting the type of information (e.g., threads, heaps, etc.) that the user can display for a selected virtual machine. For example, as depicted, the "Threads" tab is selected from the control 518, and as such, thread information is displayed in the selected virtual machine display area 504.

When thread information is displayed, each of the rows or entries in the selected virtual machine display area 504 can correspond to a particular thread executing on the selected virtual machine. For example, a thread entry 520 can list information for a thread named "android.server.ServerThread" that is running on the system_process virtual machine entry 516. Other columns in the selected virtual machine display area 504 can include an ID 526, a thread ID 528, a thread status 530, a user time 532 and a system time 534. As depicted for the thread entry 520, the ID 526 is "11," the thread ID 528 is "636," the thread status 530 is "wait," the user time 532 is 2177 (e.g., 2177 milliseconds), and the system time 534 is 157. IDs 526 and thread IDs 528 can be assigned sequentially as new threads are started, and the thread ID 526 can serve as the primary sort of information in the selected virtual machine display area 504. Statuses that can be displayed in the thread status 530 can include various thread "states," such as running, sleeping, blocked, waiting, initializing, starting, native (executing native code), waiting on a virtual machine resource, suspended, etc.

The image capture display area 506 can be used to display images captured from devices that are connected to the debug monitor 124. For example, if the user is debugging the photo capture function of a cell phone (e.g., to determine problems with resolution or cropping), image capture display area 506 can display the captured image from the cell phone. In some implementations, the image capture display area 506 can continually display the image of a display area on a portable device.

The log display area 508 can be used to display log information for the currently selected virtual machine. Each row in the log display area 508 can represent a specific event. In some cases, when larger amounts of information are to be written to a log, the information can span several lines or rows. The log information can be organized chronologically, such as by ascending order of the value in a time column 542. The time value in the time column 542 can include a date and a time. Time values can be represented to a fraction of a second (e.g., thousandths of a second).

Additional columns representing log information can include a process ID column 544, a priority column 545, a tag column 546 and a message column 548. The process ID column 544 can identify the numeric ID (e.g., 618, 652, etc.) corresponding to a thread in the selected virtual machine display area 504. The priority column 545 can identify a priority or type for a corresponding log message. Possible priorities can include Verbose (V), Debug (D), Information (I), Warning (W), or Error (E). For example, as shown in FIG. 5, the displayed messages are classified as Information and Debug log messages.

The tag column 546 can be used to display a descriptive tag or name associated with a log entry, such as "Battery Service" when the log entry corresponds to servicing the battery in the device, or "dalvikvm-gc" when the Dalvikvm garbage collection system performs a function, or any other tag that can be associated with a thread that updates the log. The message column 548 can identify the actual message can that provide the rationale for the log entry in the first place. Such a message column 548 can contain messages for current events and statistics. For example, a two-line entry in the log file can have a header line that reads, "Current GC heap utilization: . . . " and a second line that provides statistical information (e.g., "Grow heap from 2.5 to . . . ").

In some implementations, controls can exist for performing operations on the log information. For example, a search function can allow the user to search the log information for specific search terms. In some implementations, previously executed search terms can be saved and reused, such as in a "Search Favorites" area. The process of searching can highlight the specified search terms in the located entry. The log display area 508 can include sorting controls which can be used, for example, to sort the log information by specific columns, such as by the tag column 546, effectively grouping log events by the entities that caused them. Other controls in the log display area 508 can include controls operable to, for example, sort log information. For example, a log control panel 550 includes V, D, I, W, and E buttons that allow a user to sort by the log message types previously described.

The screenshot 500 can include other controls, such as a control 552 that can include options for updating the threads displayed, updating heap information that is displayed, halting the execution of a thread, performing garbage collection, etc. The screenshot 500 can also include a registry area 554 which can be used to display the ID and serial number of the portable device that is connected to the debug monitor. If more than one portable device or emulator is connected to the debug monitor, a user can select a desired device or emulator from the registry area 554.

Figure 6:
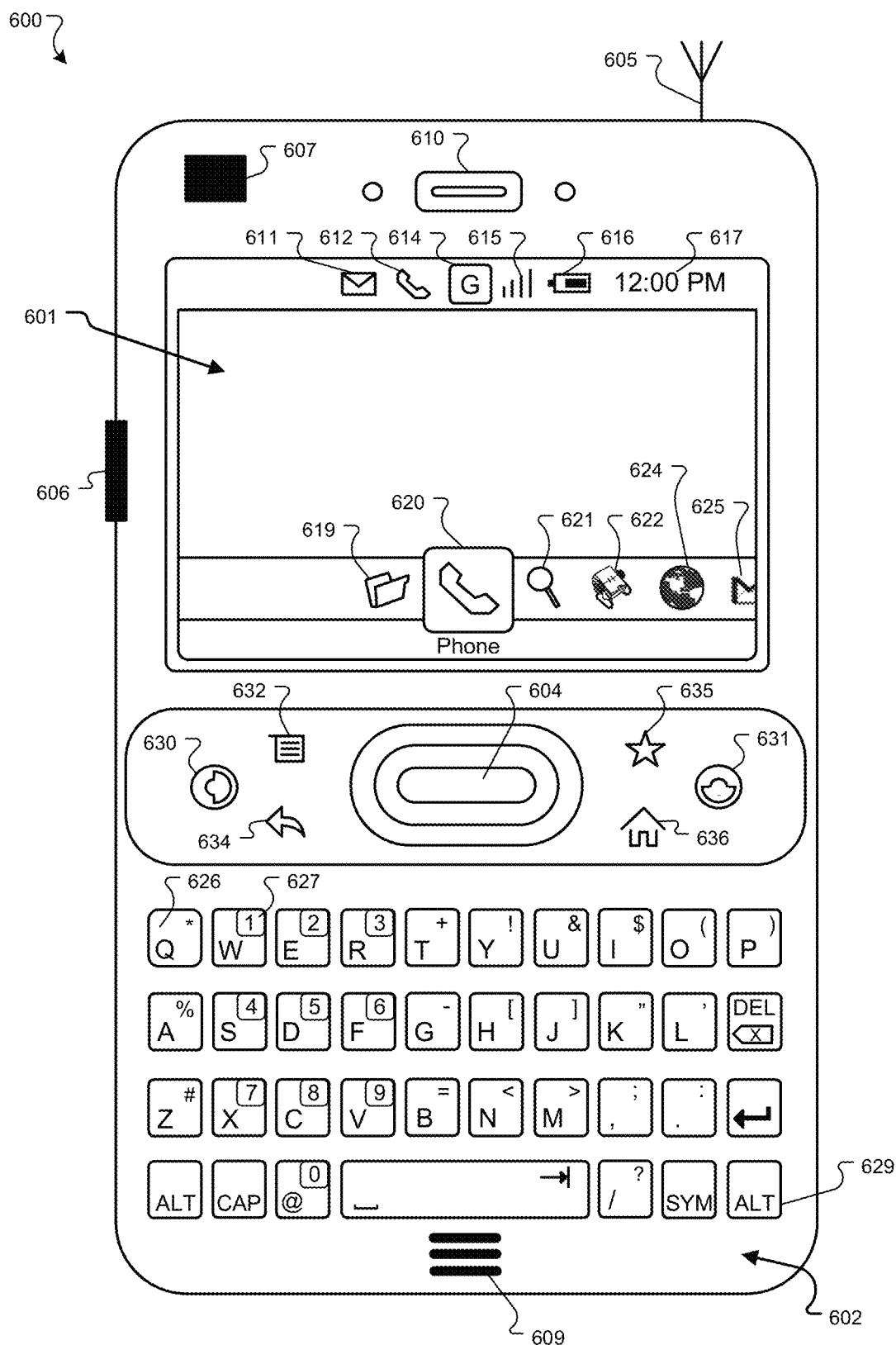
FIG. 6 is a schematic representation of an exemplary mobile device that implements embodiments of the debugger connection described herein.

Referring now to FIG. 6, the exterior appearance of an exemplary device 600 that implements the multiple-use debug connection is illustrated. Briefly, and among other things, the device 600 includes a processor configured to establish a connection with one or more virtual machines (e.g., using a debugger protocol configured to communicate debug commands to an application executed by the virtual machine), transmit a request for a current state of the one or more virtual machines using the debugger protocol, and output the current state information of the one or more virtual machines for display to a user upon request of a user of the mobile device.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna, it is anticipated that the device 600 can instead or additionally include an internal antenna, which is not visible to the user.

The display 601 can display video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications that can be debugged using the multiple-use debug connection. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backwards navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit.

The wireless or wireline computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wireline or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEE®-1394 FIREWIRE® connector, a Universal Serial Bus (USB) connector (including a mini-B USB interface connector), a serial port connector, a parallel port connector, or other wireline connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 3 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
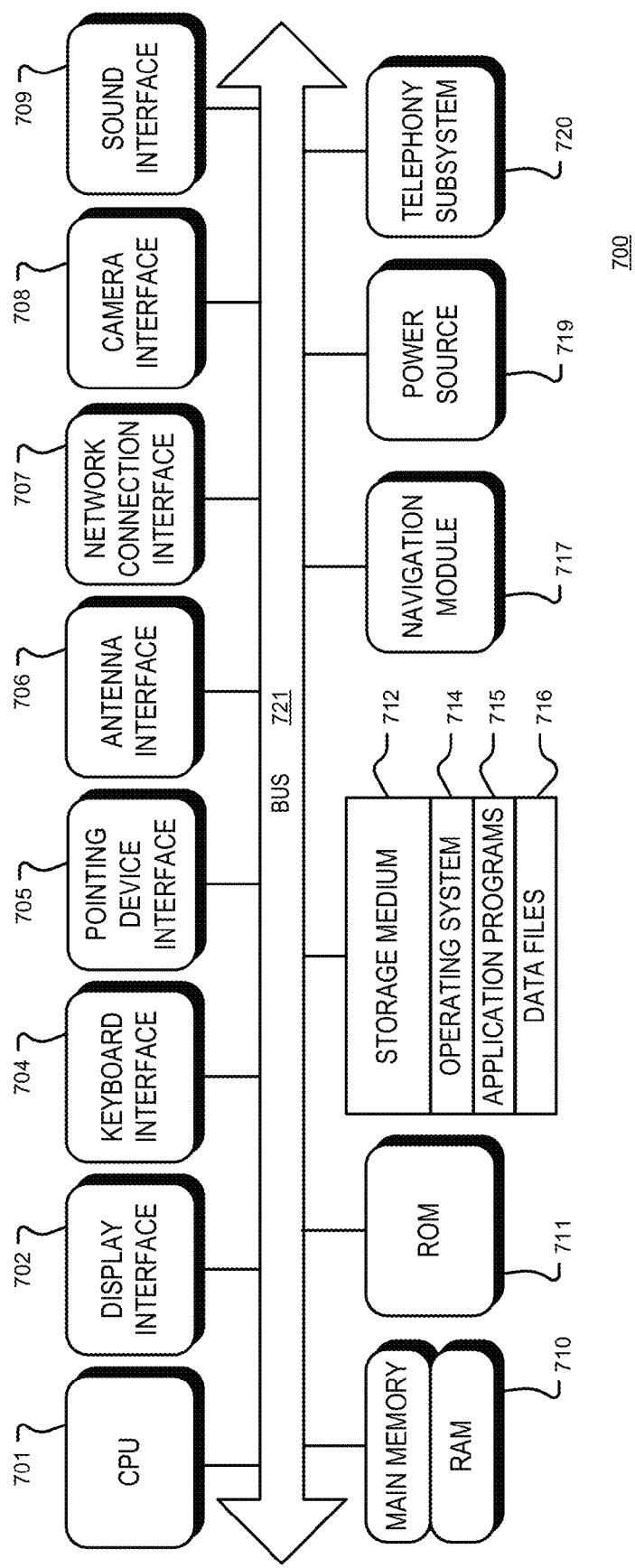
FIG. 7 is a block diagram illustrating the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 7 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 714, application programs 715 (including, for example, a web browser application, a widget or gadget engine, and or other applications, as necessary) and data files 719 are stored; a navigation module 721 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 can be one of a number of computer processors, including microprocessors, microcontrollers, and other types of integrated circuit controller chips. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external or internal hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to establish a multiple-use debug connection with the mobile device. In some embodiments, the computer program product includes instructions that establish a connection with one or more virtual machines (e.g., using a debugger protocol configured to communicate debug commands to an application executed by the virtual machine), transmit a request for a current state of the one or more virtual machines using the debugger protocol, and output the current state information of the one or more virtual machines for display to a user.

The operating system 714 may be a LINUX®-based operating system such as the GOOGLE® mobile device platform operating system, APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 714 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT®.NET Compact, or another appropriate environment.

The device stores computer-executable code for the operating system 714, and the application programs 715 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 715 may also include a widget or gadget engine, such as a TAFRI™ widget engine, a MICROSOFT® gadget engine such as the WINDOWS SIDEBAR® gadget engine or the KAPSULES™ gadget engine, a YAHOO!® widget engine such as the KONFABULTOR™ widget engine, the APPLE® DASHBOARD® widget engine, the GOOGLE® gadget engine, the KLIPFOLIO® widget engine, an OPERA™ widget engine, the WIDSETS™ widget engine, a proprietary widget or gadget engine, or other widget or gadget engine the provides host system software for a physically-inspired applet on a desktop.

Although it is possible to provide for the multiple-use debug connection using the above-described implementation, it is also possible to implement the functions according to the present disclosure as a dynamic link library (DLL), or as a plug-in to other application programs such as an Internet web-browser such as the FOXFIRE web browser, the APPLE® SAFARI® web browser or the MICROSOFT® INTERNET EXPLORER® web browser.

The navigation module 721 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 721 may also be used to measure angular displacement, orientation, or velocity of the device 600, such as by using one or more accelerometers.

Figure 8:
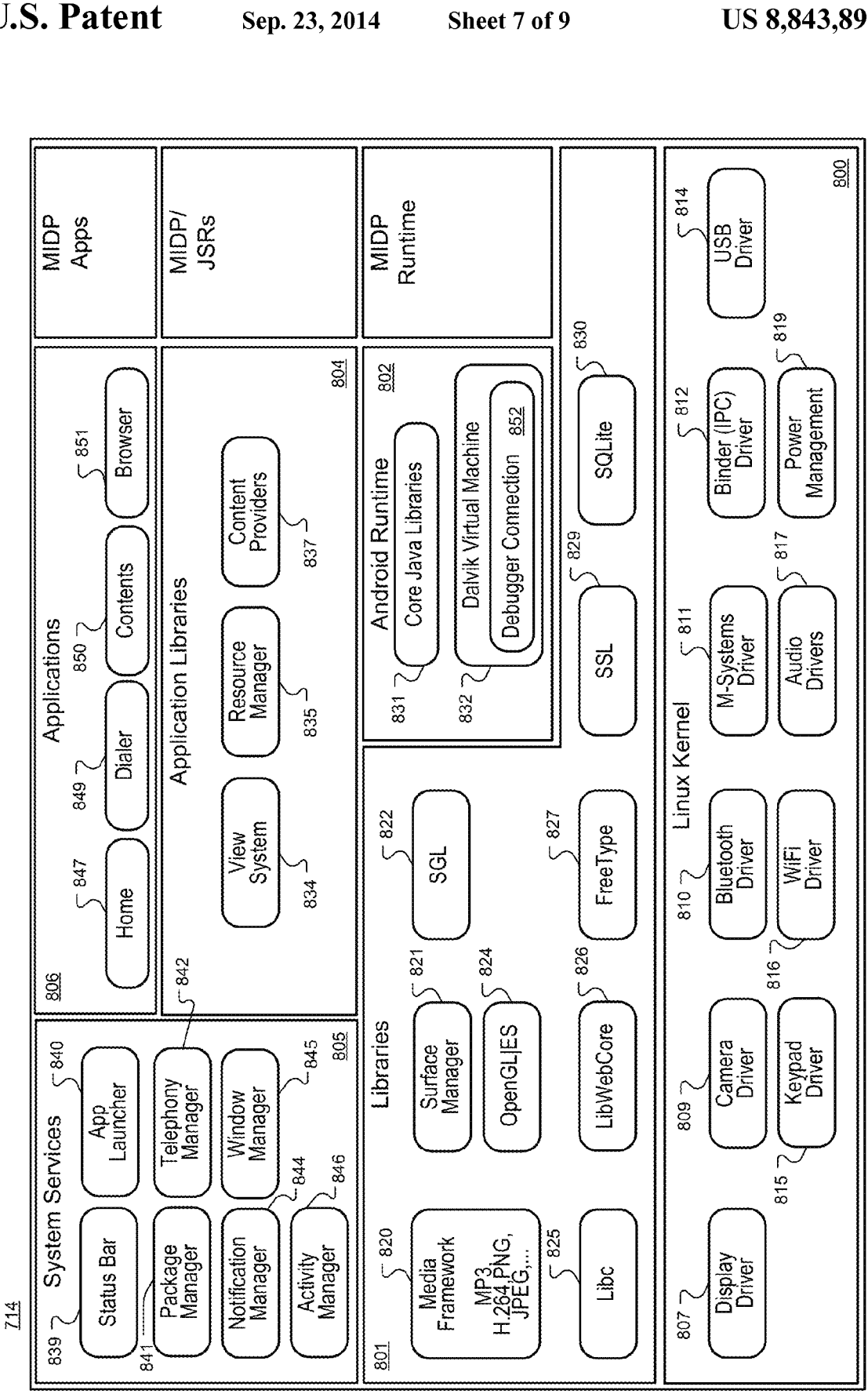
FIG. 8 is a block diagram illustrating exemplary components of the operating system used by the device of FIG. 7.

FIG. 8 is a block diagram illustrating exemplary components of the operating system 714 used by the device 600, in the case where the operating system 714 is the GOOGLE® mobile device platform operating system. The operating system 714 invokes multiple processes, while ensuring that the associated phone application is responsive, and that wayward applications do not cause a fault (or "crash") of the operating system. Using task switching, the operating system 714 allows for the switching of applications while on a telephone call, without losing the state of each associated application. The operating system 714 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 714 can generally be organized into six components: a kernel 800, libraries 801, an operating system runtime 802, application libraries 804, system services 805, and applications 806. The kernel 800 includes a display driver 807 that allows software such as the operating system 714 and the application programs 815 to interact with the display 601 via the display interface 702, a camera driver 809 that allows the software to interact with the camera 607 via the camera interface 708; a BLUETOOTH® driver 810; an M-Systems driver 811; a binder (IPC) driver 812, a USB driver 814 a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 819.

The BLUETOOTH® driver, which in one implementation is based on the BlueZ BLUETOOTH® stack for LIN WC-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA® Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802 includes core JAVA libraries 831, and a Dalvik virtual machine 832. The Dalvik virtual machine 832 is a virtual machine that runs a customized file format (.DEX). The virtual machine 832 can include debug connection code used to recognize state queries and other information requested by the debug monitor.

The operating system 714 can also include Mobile Information Device Profile (MIDP) components such as the MIDP JAVA Specification Requests (JSRs) components, MIDP runtime, and MIDP applications as shown in FIG. 8. The MIDP components can support MIDP applications running on the device 600.

With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804 include a view system 834, a resource manager 835, and content providers 837. The system services 805 includes a status bar 839; an application launcher 840; a package manager 841 that maintains information for all installed applications; a telephony manager 842 that provides an application level JAVA® interface to the telephony subsystem 820; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806 include a home application 847, a dialer application 849, a contacts application 850, and a browser application 851.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
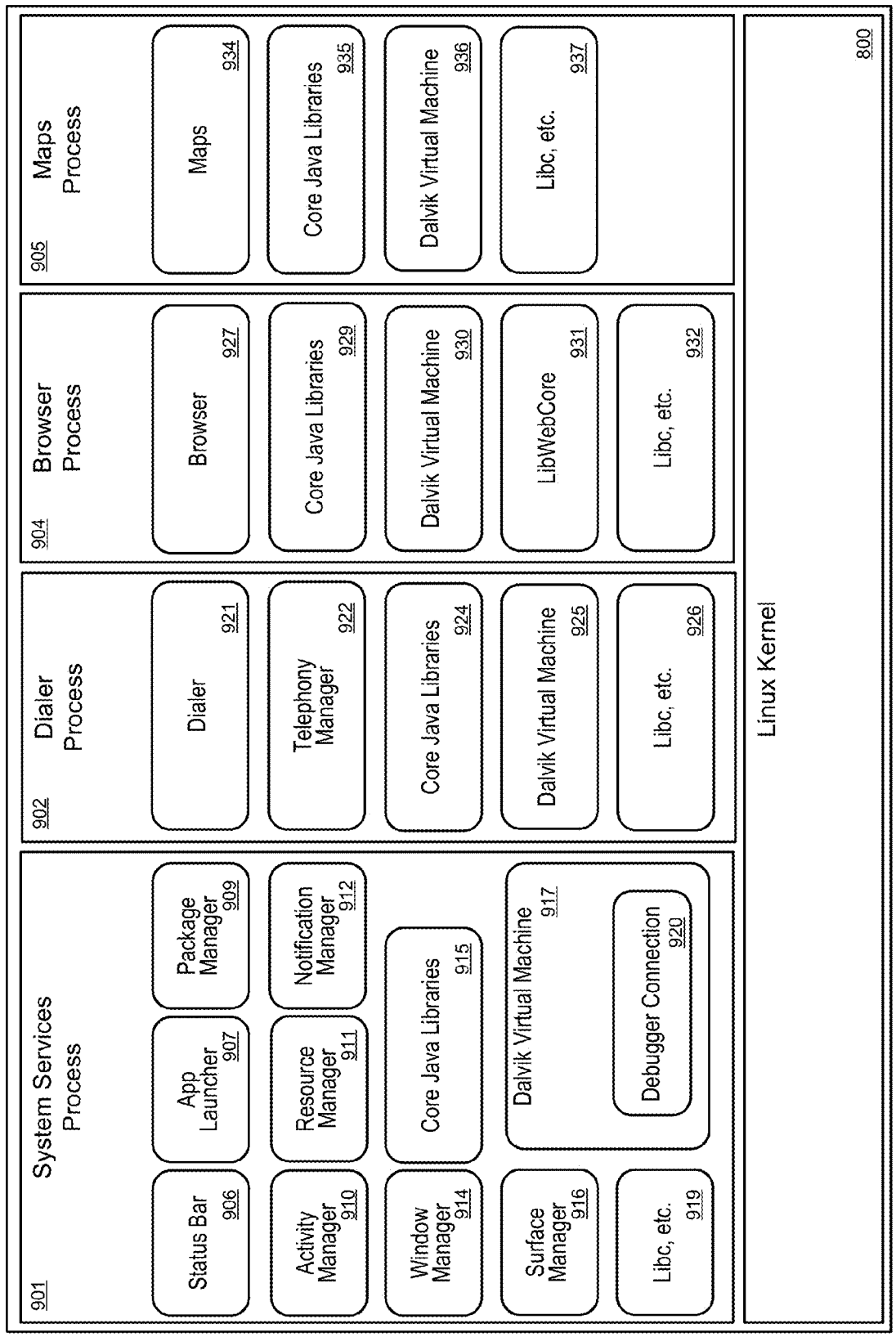
FIG. 9 is a block diagram illustrating exemplary processes implemented by the operating system kernel of FIG. 8.

FIG. 9 is a block diagram illustrating exemplary processes implemented by the operating system kernel 800. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 916, the window manager 914, or the activity manager 910 can be continuously executed while the device 600 is powered. Additionally, some application-specific process can also be persistent. For example, processes associated with the dialer application 921, may also be persistent.

The processes implemented by the operating system kernel 800 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager that provides access to graphics, localized strings, and XML layout descriptions; notification manger processes 912 associated with the notification manager 844; window manager processes 914 associated with the window manager 845; core JAVA® libraries processes 915 associated with the core JAVA® libraries 831; surface manager processes 916 associated with the surface manager 821; LIBC processes 919 associated with the LIBC library 825; and Dalvik virtual machine processes 917 associated with the Dalvik virtual machine 832. As described previously, the virtual machine 917 can include "debugger connection" code that permits the virtual machine to receive and respond to queries from the debug monitor. Although not shown in the FIG. 9, this code can be included in the other virtual machines as well.

The dialer processes 902 include dialer application processes 921 associated with the dialer application 849; telephony manager processes 922 associated with the telephony manager 842; core JAVA® libraries processes 924 associated with the core JAVA® libraries 831; Dalvik virtual machine processes 925 associated with the Dalvik Virtual machine 832; and LIBC processes 926 associated with the LIBC library 825. The browser processes 904 include browser application processes 927 associated with the browser application 851; core JAVA® libraries processes 929 associated with the core JAVA® libraries 831; Dalvik virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA® libraries processes 935, Dalvik virtual machine processes 936, and LIBC processes 937. Notably, some processes, such as the Dalvik virtual machine processes, may exist within one or more of the systems services processes 901, the dialer processes 902, the browser processes 904, and the maps processes 905.

Figure 10:
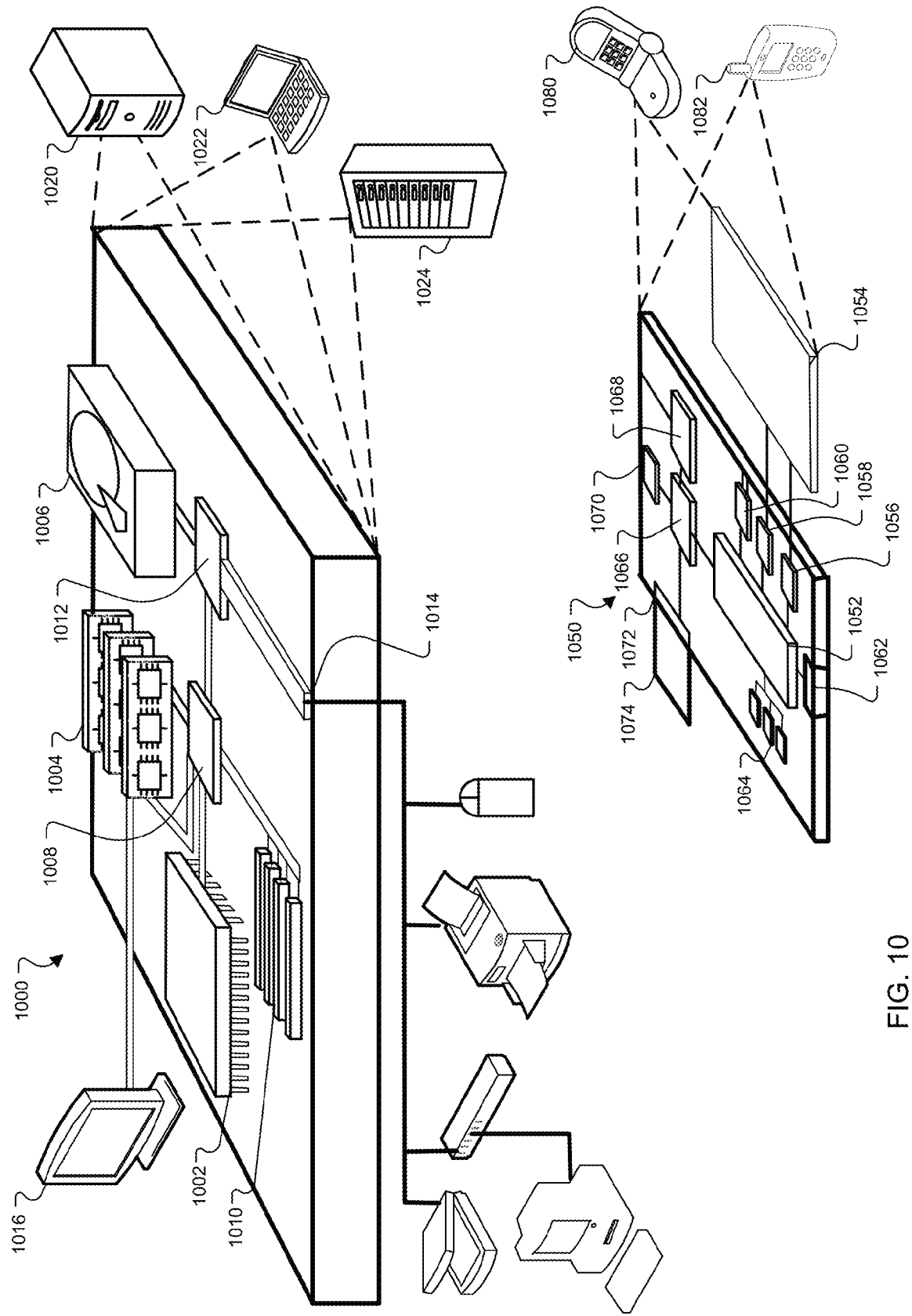
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the debug monitor 124 can also serve as an interface between the various debuggers 102 and the debugger protocol 110, such as by converting debugger 102 commands into a format used by the debugger protocol 110 (e.g., as queries 116 and 120). Moreover, the debug monitor 124 can transform the query responses 118 and 122 into the format used by the debuggers 102.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:

initiating, by a debug monitor, a respective Java Debug Wire Protocol (JDWP) connection between the debug monitor and each of a plurality of virtual machines, wherein the debug monitor is hosted on a computing device and the virtual machines are not hosted on the computing device, generating, by the debug monitor, a first request packet of JDWP data including, in an unreserved bits section of the first request packet, a Dalvik Debug Monitor (DDM) protocol request to at least one of the virtual machines for current state information of the at least one virtual machine, wherein the current state information of the at least one virtual machine includes at least one state variable of the at least one virtual machine;

transmitting, by the debug monitor over the respective JDWP connection to at least one of the virtual machines, the first request packet of JDWP data including the DDM protocol request for current state information of the at least one virtual machine;

receiving, by the debug monitor and in response to the first request, a first reply packet of JDWP data that includes, in an unreserved bits section of the first reply packet, a DDM protocol reply that includes the current state information of the at least one virtual machine, the current state information including the at least one state variable;

receiving, by the debug monitor, at least one DDM protocol debug command from a debugger for debugging a particular application loaded on one of the virtual machines;

generating, by the debug monitor, a second request packet of JDWP data including, in an unreserved bits section of the second request packet, the at least one DDM protocol debug command from the debugger for debugging a particular application;

transmitting, by the debug monitor over the respective JDWP connection, the second request packet of JDWP data including the at least one debug command from the debugger for debugging a particular application, to the virtual machine on which the particular application is loaded;

receiving, by the debug monitor and in response to the second request, a second reply packet of JDWP data including, in an unreserved bits section of the second reply packet, DDM protocol results from the virtual machine for executing the at least one debug command;

transmitting, by the debug monitor, the DDM protocol results from the virtual machine to the debugger; and providing a representation of at least a portion of the current state information of the at least one virtual machine for display to a user, the portion of the current state information including the at least one state variable.

2. The method of claim 1, wherein the first request is transmitted before the second request is transmitted.

3. The method of claim 1, wherein the first request is transmitted after the second request is transmitted.

4. The method of claim 1, wherein transmitting the first request is neither caused by nor in response to transmitting the second request, and wherein transmitting the second request is neither caused by nor in response to transmitting the first request.

5. The method of claim 4, wherein the first request for the current state information is transmitted more than once during a given debug session for the debugger.

6. The method of claim 1, wherein the at least one state variable is inaccessible to the at least one debug command.

7. The method of claim 1, wherein the particular application has at least one thread and the at least one state variable includes a thread identification (ID) and a thread state for each corresponding thread of the particular application, and wherein the thread state for a particular thread includes a thread status, CPU and memory usage statistics for the particular thread.

8. The method of claim 1, wherein the at least one state variable includes: heap information of the at least one virtual machine for which the current state information is being sought, and wherein the heap information is represented by a color-coded bitmap, the bitmap indicating which stretches or blocks of memory are free and which stretches of blocks of memory are in use.

9. The method of claim 8, wherein the at least one virtual machine has more than one heaps including a native heap, and wherein the heap information of the at least one virtual machine includes a heap identification (ID) for each heap.

10. The method of claim 8, wherein the heap information of the at least one virtual machine includes current garbage collection heap information.

11. The method of claim 1, wherein the at least one virtual machine for which the current state information is being sought does not include the virtual machine to which the second request is being transmitted.

12. A non-transitory computer-readable medium, comprising instructions that, when executed by one or more computers, causes the one or more computers to perform operations comprising initiating, by a debug monitor, a respective JDWP connection between the debug monitor and each of a plurality of virtual machines, wherein the debug monitor is hosted on the one or more computers and the virtual machines are not hosted on the one or more computers;

generating, by the debug monitor, a first request packet of JDWP data including, in an unreserved bits section of the first request packet, a DDM protocol request to at least one of the virtual machines for current state information of the at least one virtual machine, wherein the current state information of the at least one virtual machine includes at least one state variable of the at least one virtual machine;

transmitting, over the respective JDWP connection to at least one of the virtual machines, the first request packet of JDWP data including the DDM protocol request for current state information of the at least one virtual machine;

receiving, by the debug monitor and in response to the first request, a first reply packet of JDWP data that includes, in an unreserved bits section of the first reply packet, a DDM protocol reply that includes the current state information of the at least one virtual machine, the current state information including the at least one state variable;

receiving, by the debug monitor, at least one DDM protocol debug command from a debugger for debugging a particular application loaded on one of the virtual machines;

generating, by the debug monitor, a second request packet of JDWP data including, in an unreserved bits section of the second request packet, the at least one DDM protocol debug command from the debugger for debugging a particular application;

transmitting, by the debug monitor over the respective JDWP connection, the second request packet of JDWP data including the at least one debug command from the debugger for debugging a particular application, to the virtual machine on which the particular application is loaded;

receiving, by the debug monitor and in response to the second request, a second reply packet of JDWP data including, in an unreserved bits section of the second reply packet, DDM protocol results from the virtual machine for executing the at least one debug command;

transmitting, by the debug monitor, the DDM protocol results from the virtual machine to the debugger; and providing a representation of at least a portion of the current state information of the at least one virtual machine for display to a user, the portion of the current state information including the at least one state variable.

13. The computer-readable medium of claim 12, wherein the first request is transmitted before the second request is transmitted.

14. The computer-readable medium of claim 12, wherein the first request for the current state information is transmitted more than once during a given debug session for the debugger.

15. The computer-readable medium of claim 12, wherein the at least one state variable is inaccessible to the at least one debug command.

16. The computer-readable medium of claim 12, wherein the at least one state variable includes: heap information of the at least one virtual machine for which the current state information is being sought, and wherein the heap information is represented by a color-coded bitmap, the bitmap indicating which stretches or blocks of memory are free and which stretches of blocks of memory are in use.

17. The computer-readable medium of claim 12, wherein the at least one virtual machine for which the current state information is being sought does not include the virtual machine to which the second request is being transmitted.

18. A system comprising:

one or more computers; and a computer-readable medium having instructions stored thereon which, when executed by the one or more computers, cause the one or more computers to perform operations comprising:

initiating, by a debug monitor, a respective JDWP connection between the debug monitor and each of a plurality of virtual machines, the debug monitor is hosted on the one or more computers and the virtual machines are not hosted on the one or more computers;

generating, by the debug monitor, a first request packet of JDWP data including, in an unreserved bits section of the first request packet, a DDM protocol request to at least one of the virtual machines for current state information of the at least one virtual machine, wherein the current state information of the at least one virtual machine includes at least one state variable of the at least one virtual machine;

transmitting, by the debug monitor over the respective JDWP connection to at least one of the virtual machines, the first request packet of JDWP data including the DDM protocol request for current state information of the at least one virtual machine;

receiving, by the debug monitor and in response to the first request, a first reply packet of JDWP data that includes, in an unreserved bits section of the first reply packet, a DDM protocol reply that includes the current state information of the at least one virtual machine, the current state information including the at least one state variable;

receiving, by the debug monitor, at least one DDM protocol debug command from a debugger for debugging a particular application loaded on one of the virtual machines;

generating, by the debug monitor, a second request packet of JDWP data including, in an unreserved bits section of the second request packet, the at least one DDM protocol debug command from the debugger for debugging a particular application;

transmitting, by the debug monitor over the respective JDWP connection, the second request packet of JDWP data including the at least one debug command from the debugger for debugging a particular application, to the virtual machine on which the particular application is loaded;

receiving, by the debug monitor and in response to the second request, a second reply packet of JDWP data including, in an unreserved bits section of the second reply packet, DDM protocol results from the virtual machine for executing the at least one debug command;

transmitting, by the debug monitor, the DDM protocol results from the virtual machine to the debugger; and providing a representation of at least a portion of the current state information of the at least one virtual machine for display to a user, the portion of the current state information including the at least one state variable.

* * * * *